United States Patent [19]

Inoue

[11] Patent Number: 5,102,170
[45] Date of Patent: Apr. 7, 1992

[54] PIPE JOINT
[75] Inventor: Noboru Inoue, Kashihara, Japan
[73] Assignee: Nitta-Moore Co., Ltd., Osaka, Japan
[21] Appl. No.: 619,928
[22] Filed: Nov. 28, 1990

[30] Foreign Application Priority Data

Mar. 23, 1990 [JP] Japan .................... 2-74293
Sep. 21, 1990 [JP] Japan .................... 2-253194

[51] Int. Cl.⁵ .............................................. F16L 55/00
[52] U.S. Cl. ........................................... 285/23; 285/101;
285/255; 285/307; 285/906
[58] Field of Search ............... 285/307, 349, 255, 322,
285/323, 316, 906, 23, 101, 169

[56] References Cited

U.S. PATENT DOCUMENTS

| | | | |
|---|---|---|---|
| 2,866,538 | 9/1957 | Conrad | 285/322 X |
| 3,239,246 | 3/1966 | Barber | 285/23 |
| 3,352,576 | 11/1967 | Thomsen | 285/169 |
| 4,303,263 | 12/1981 | Legris | 285/323 X |
| 4,775,171 | 10/1988 | Marshall | 285/101 |
| 4,790,571 | 12/1988 | Montanari et al. | 285/322 X |

FOREIGN PATENT DOCUMENTS 2398958 3/1979 France .................... 285/249

Primary Examiner—Dave W. Arola
Attorney, Agent, or Firm—Koda and Androlia

[57] ABSTRACT

A pipe joint comprises a cylindrical main body 1 with both ends open, at least one of which is to be a pipe insertion port 10, a slender slidable cylinder 2 coaxially installed in the main body 1 so as to slide therein freely to and fro in a certain range, its free end facing the pipe insertion port 10, and a holding cylinder 3 inserted between the main body 1 and the slidable cylinder 2 in a manner to move freely back and forth. The main body 1 has a taper 11 diminishing toward the pipe insertion port 10 on its inner circumference near the port 10. The holding cylinder 3 has a slit 30 open to the pipe insertion port 10 and its outside diameter is slightly larger than the inside diameter of the pipe insertion port 10. In a state where a pipe is forcibly fitted on the slidable cylinder 2 externally, the holding cylinder 3 moves toward the pipe insertion port 10 along with the pipe being pulled back. And the main body 1 has a penetration opening 12 to receive a stick in its circumferential wall, and the holding cylinder 3 has a stopping part 31 to engage with the stick when it is inserted in the opening 12 in a state where the holding cylinder 3 and the taper 11 are not abutting against each other.

13 Claims, 6 Drawing Sheets 5,102,170

PIPE JOINT

BACKGROUND OF THE INVENTION

1. Field of the Invention

The present invention relates to a pipe joint for coupling piping.

2. Prior Art

An example of a conventional pipe point is shown in FIG. 7.

As shown in the drawing, this joint has, in its cylindrical main body 1 with a male threaded portion at one end, a slender cylinder 2 slidably and coaxially installed, and a holding cylinder 3 placed between the slender slidable cylinder 2 and the main body 1 in the way to slide freely to and fro, and the gripping force by the slidable cylinder 2 and the holding cylinder 3 secures a pipe inserted between them in a non-detachable manner.

The main body 1, as shown in the drawing, has a pipe insertion port 10 at the other end, and a taper 11 narrowing toward the opening port provided in the inner circumference near this pipe insertion port 10.

The holing cylinder 3 is made of elastic material and has a slit 30 opening toward the pipe insertion port 10 in its circumferential wall, and, as shown in the drawing, its outside diameter is slightly larger than the diameter of the pipe insertion port 10.

The space between the holding cylinder 3 and the slidable cylinder 2 is set slightly smaller than the wall thickness of a pipe to be connected to them.

Therefore, when a pipe is inserted forcibly into the space between the holding cylinder 3 and the slidable cylinder 2 through the pipe insertion port 10 and then pulled back, the holding cylinder 3 and the slidable cylinder 2 are to move toward the pipe insertion port 10 together with the pipe. From the moment that the holding cylinder 3 abuts against the taper 11, the pressing force by the taper 11 acts on the holding cylinder 3 in a direction of reducing its diameter. In consequence, the gripping force on the pipe by the holding cylinder 3 and the slidable cylinder 2 increases, thereby the pipe being secured in a locked state.

As aforementioned, in this type of pipe joint, easy and convenient connection is conducted only by inserting a pipe through the piping insertion port 10 and then pulling it back.

However, this pipe joint has a disadvantage that the once connected pipe cannot be detached therefrom.

SUMMARY OF THE INVENTION

The present invention is conducted in the light of the above circumstances, and it is a primary object thereof to provide a pipe joint of the above type which is capable of connecting and disconnecting a pipe easily.

To achieve the above object and other objects disclosed hereunder in the description and the claims, the invention is composed as follows.

According to an embodiment of the present invention, the pipe joint comprises a cylindrical-shape main body 1 with both ends open, at least one of which is to be a pipe insertion port 10, a slender slidable cylinder 2 coaxially installed in the main body 1 so as to slide therein freely to and fro in a specific range, its free end facing the pipe insertion port 10, and a holding cylinder 3 inserted between the main body 1 and the slidable cylinder 2 in a manner to move freely to and fro. And the main body 1 has a taper 11 diminishing toward the pipe insertion port 10 on the inner circumference near the port 10. The holding cylinder 3 has a slit 30 open to the pipe insertion port 10 and its outside diameter is slightly larger than the inside diameter of the pipe insertion port 10. And in a state where a pipe is forcibly fitted on the slidable cylinder 2 externally, the holding cylinder 3 moves toward the pipe insertion port 10 along with the pipe being pulled back. In the above-mentioned pipe joint, the main body 1 has a penetration opening 12 to receive a stick A in its circumferential wall, and the holding cylinder 3 has a stopping part 31 to engage with the stick A when it is inserted in the opening 12 in a state where the holding cylinder 3 and the taper 11 are not abutting against each other.

According to an embodiment of the invention, the pipe joint comprises a cylindrical-shape main body 1 with both ends open, at least one of which is to he a pipe insertion port 10, a slender slidable cylinder 2 coaxially installed in the main body 1 so as to slide therein freely to and fro in a specific range, its free end facing the pipe insertion port 10, and a holding cylinder 3 inserted between the main body 1 and the slidable cylinder 2 in a manner to move freely to and fro. The main body 1 has a taper 11 diminishing toward the pipe insertion port 10 on the inner circumference near the port 10. The holding cylinder 3 has a slit 30 open to the pipe insertion port 10 and its outside diameter is slightly larger than the inside diameter of the pipe insertion port 10. A space between the slidable cylinder 2 and the holding cylinder 3 is slightly smaller than the wall thickness of a pipe to be inserted therein. In the above-mentioned pipe joint, the main body 1 has a penetration opening 12 to receive a stick A in its circumferential wall, and the holding cylinder 3 has a stopping part 31 to engage with the stick A when it is inserted in the opening 12 in a state where the holding cylinder 3 and the taper 11 are not abutting against each other.

According to an embodiment of the invention, the pipe joint comprises a cylindrical-shape main body 1 with both ends open, at least one of which is to be a pipe insertion port 10, a slender slidable cylinder 2 coaxially installed in the main body 1 so as to slide therein freely to and fro in a specific range, its free end facing the pipe insertion port 10. and a holding cylinder 3 inserted between the main body 1 and the slidable cylinder 2 in a manner to move freely to and fro. The main body 1 has a taper 11 diminishing toward the pipe insertion port 10 on the inner circumference near the port 10. The holding cylinder 3 has a slit 30 open to the pipe insertion port 10 and its outside diameter is slightly larger than the inside diameter of the pipe insertion port 10. The diameter of the slidable cylinder 2 is set larger than the inside diameter of a pipe to be inserted therein and a stopping member is provided for pressing the holding cylinder 3 in the same direction of and along with the slidable cylinder 2 toward the pipe insertion port 10. In the above-described pipe joint, tho main body 1 has a penetration opening 12 to receive a stick A in its circumferential wall, and the holding cylinder 3 has a stopping part 31 to engage with the stick A when it is inserted in the opening 12 in a state where the holding cylinder 3 and the taper 11 are not abutting against each other.

According to an embodiment, in addition to the first mentioned embodiment, the stick A is installed in a state of being thrust with a spring outwardly in the radial direction of the main body 1, and its inner end confronts the outside of the stopping part of the holding cylinder 3.

The pipe joint of the invention with the above means provides the following function.

It is easy to couple piping by using the pipe joint of the embodiments of the present invention with the method as described before under the prior art.

Removing a connected pipe from this pipe joint is described below. First of all pushing the connected pipe inward releases the engagement between the holding cylinder 3 and the taper 11, and the pressing force by the taper 11 on the holding cylinder 3 fails, then the gripping force on the pipe by the slidable cylinder 2 and the holding cylinder 3 becomes as small as the elastic restoring force of the holding cylinder 3. Thus, in a state where the taper 11 and the holding cylinder 3 are not in contact, the stick A is inserted into the penetration opening 12, then the pipe is pulled back, so the stick A and the stopping part 31 get engaged, and thus movement of the holding cylinder 3 toward the pipe insertion port is blocked.

Therefore, the gripping force by the holding cylinder 3 and the slidable cylinder 2 is not increased, then the connected pipe may be drawn out.

According to an embodiment of the invention, pressing the outer end of the stick A in with resisting the thrusting force of the spring causes its inner end to engage with the stopping part 31 of the holding cylinder 3, and when the pressing force is released, the thrusting force of the spring returns the stick A to the position where its inner end confronts the outside of the stopping part 31.

Therefore, with pressing the stick A inward the same way of inserting the stick A described in the embodiments, the movement of the holding cylinder 3 toward the pipe insertion port 10 is similarly blocked, and hence not only connection but also removal of piping may be achieved easily by employing the pipe joint of the present invention. Moreover, since the stick A is provided with a socket 1b, loss of the stick A may be avoided.

Other features and benefits of the invention will be better understood and appreciated from the following detailed description referring to the accompanying drawings.

DETAILED DESCRIPTION OF THE INVENTION

Figure 1:
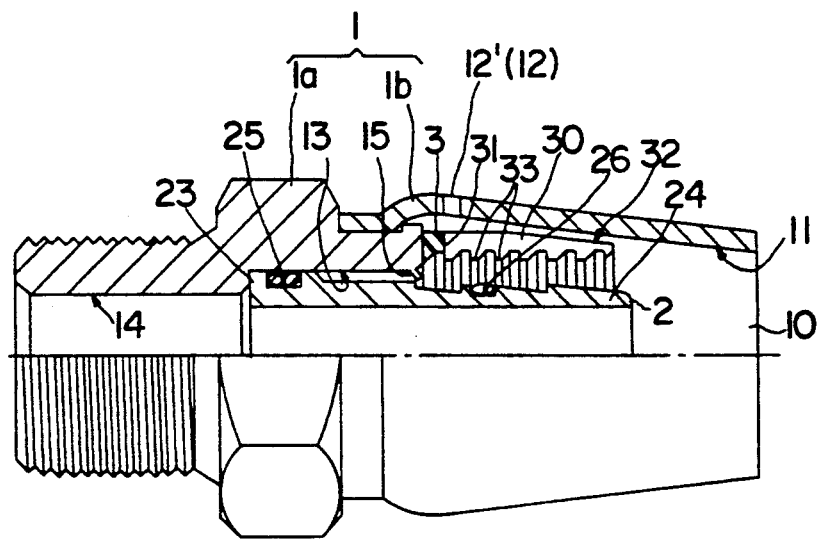
FIG. 1 is a semisectional view of a pipe joint of the present invention.

Referring now to the drawings, some of the embodiments of the invention are described in detail below.

The pipe joint, as shown in FIG. 1, comprises a cylindrical main body 1 with both ends open, a slender slidable cylinder 2 coaxially installed in the main body 1 so as to slide freely in a specific range, and a holding cylinder 3 placed between the main body 1 and the slidable cylinder 2 so as to move freely to and fro.

The main body 1, as shown in FIG. 1, has a socket 1b caulked on one end of its nipple 1a, and the front end part of the socket 1b forms a pipe insertion port 10.

The nipple 1a, as shown in FIG. 1, has its inner circumferential surface composed of a large diameter bore 13 and a small diameter bore 14, and the large diameter bore 13 has an inward protuberance 15 on its end part of the connection side with the socket 1b.

Figure 3:
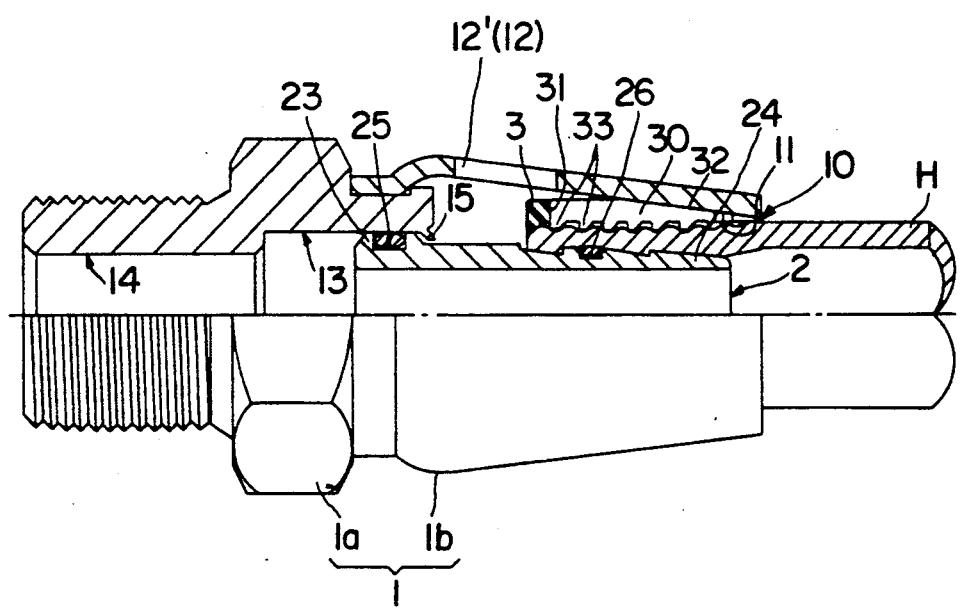
FIG. 3 shows a state where a pipe is connected by the pipe joint of the invention.

The socket 1b here is a cylindrical structure with a uniform wall thickness, and diminishes in diameter toward the end port to form a taper 11 in the inner circumferential face near the pipe insertion port 10. Near the caulking area in the circumferential wall of the socket 1b is provided a through hole 12' to receive a stick A (which corresponds to the penetration opening 12 described in the claims and is not limited to a circular form). This through hole 12' is formed in part of the socket 1b and this position confronts the end part of the slit 30 of the holding cylinder 3 in its compressed state. The penetration opening 12 may be either a slot or a slit open toward the pipe insertion port 10 as shown in FIG. 3.

The slender slidable cylinder 2 has, as shown in FIG. 1, on one end a large diameter part 23 of which diameter is slightly smaller than the large diameter bore 13, and on the other end a small diameter part 24 on which a pipe is to be fitted externally, and the slidable cylinder 2 is installed to the nipple 1a in the way the large diameter part 23 is stored in the large diameter bore 13. This slidable cylinder 2 is designed to slide back and forth in a range between the stepped part of the large diameter bore 13 and the small diameter bore 14 and the inner protuberance 15.

The large diameter part 23 has a groove 25 on its outer circumference as shown in FIG. 1, and the groove 25 has an O-ring in it, thereby maintaining airtightness between the large diameter part 23 of the slidable cylinder 2 and the large diameter bore 13 of the nipple 1a. The small diameter part 24 also has a groove 26 on its outer circumference, and the groove 26 has an O-ring in it. As shown in FIG. 3, in a state where a pipe H is held between the slidable cylinder 2 and the holding cylinder 3, airtightness between the inner circumference of the pipe H and the outer circumference of the slidable cylinder 2 is maintained.

Figure 2:
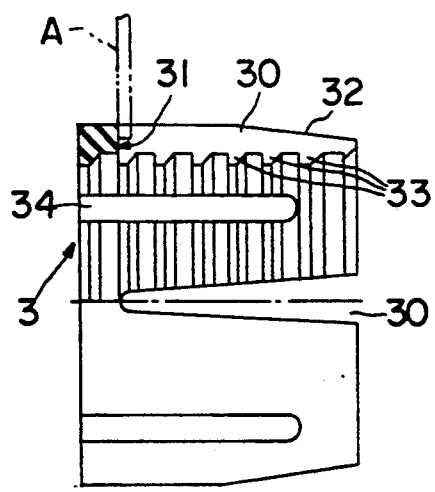
FIG. 2 is a semisectional view of a holding cylinder used in the same pipe joint.

The holding cylinder 3 is made of elastic synthetic resin, and as shown in FIGS. 1 and 2, its outside diameter is slightly larger than the diameter of the pipe insertion port 10, and a taper 32, corresponding to the aforementioned taper 11, is provided on the outer circumference near the pipe insertion port 10. And plural stopping pawls 33 are provided in the inner circumference of the holding cylinder 3. Besides, a slit 30 open to one end and a slit 34 open to the other end are alternately provided on the outer circumferential wall of the holding cylinder 3.

In this constitution, in a state where the slidable cylinder 2 and the holding cylinder 3 are stored in the main body 1 as shown in FIG. 1, the space between the slidable cylinder 2 and the holding cylinder 3 is set slightly smaller than the wall thickness of the pipe H to be inserted therein, shown in FIG. 3.

Since this pipe joint is constituted as described herein, when the pipe H is inserted by force between the slidable cylinder 2 and the holding cylinder 3 through the pipe insertion port 10 of the main body 1, a gripping force by the holding cylinder 3 and the slidable cylinder 2 acts on the pipe due to the elastic restoring force of the holding cylinder 3. In this state, when the pipe H is pulled, it is, by the function described before, gripped with a strong force by the stopping pawls 33 of the holding cylinder 3 and the outer circumferential wall of the slidable cylinder 2, and the stopping pawl 33 bites into the outer surface of the pipe as shown in FIG. 3. Therefore, once connected, the pipe H will not remove from the pipe joint unexpectedly.

When detaching the pipe H, first the pipe H in the foregoing state is pushed in. Then along with the pipe H, the slidable cylinder 2 and the holding cylinder 3 are pushed in together to fall in a state shown in FIG. 4a. In this state, the engagement of the taper 32 of the holding cylinder 3 with the taper 11 of the socket 1b is cleared, and the gripping force on the pipe H by the holding cylinder 3 and the slidable cylinder 2 consists of only the elastic restoring force of the holding cylinder 3.

Figure 4A:
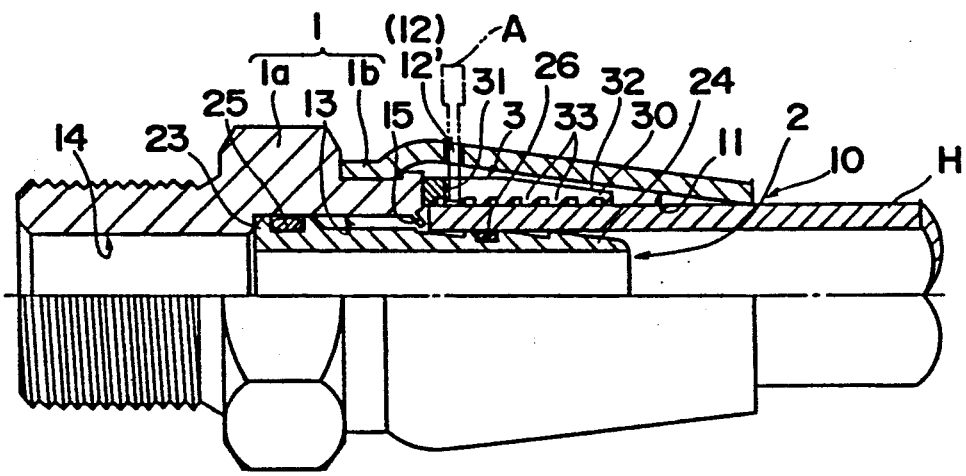
FIGS. 4a, 4b and 4c are explanatory drawings for removing a connected pipe from the pipe joint.
Figure 4B:
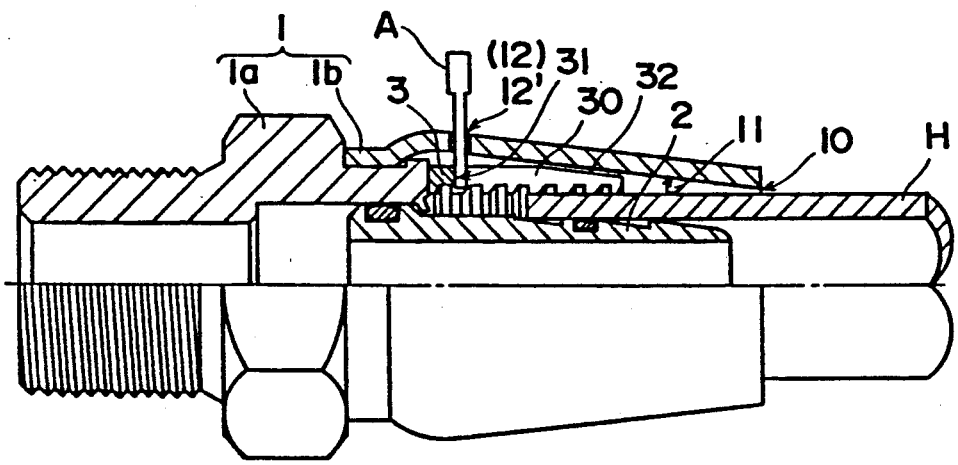
Figure 4C:
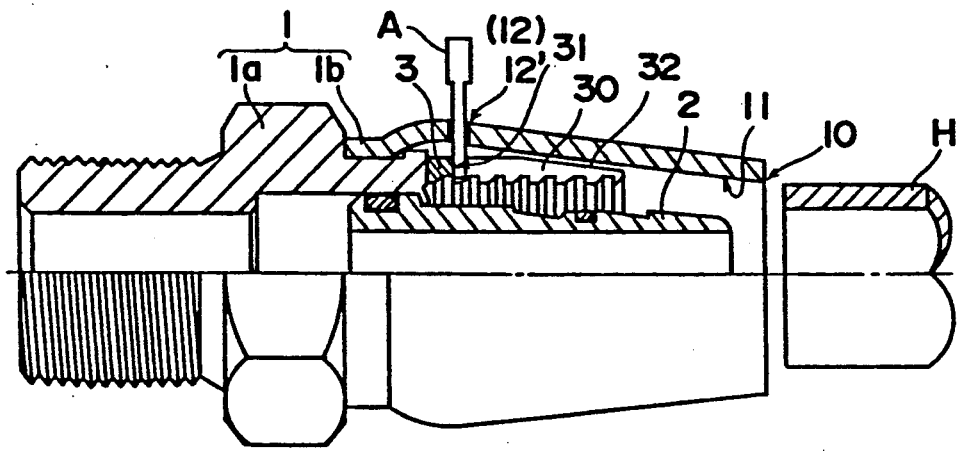

Next, in this state, the stick A is inserted into the through hole 12' provided in the socket 1b as indicated by double dot line in FIG. 4a, and its end part is inserted into the end part of the slit 30 in the holding cylinder 3. In succession, when he pipe H is pulled, the holding cylinder 3 gets in a locked state due to the engagement of the constituent end part of tho slit 30 and the stick A, and hence as shown in FIGS. 4b and 4c, the pipe H may be detached with resisting the small gripping force by the holding cylinder 3 and the slidable cylinder 2, which is no more than the small elastic restoring force of the holding cylinder 3. In this constitution, the end part constituent wall of the slit 30 corresponds to the stopping part 31 mentioned in the claims.

Figure 8:
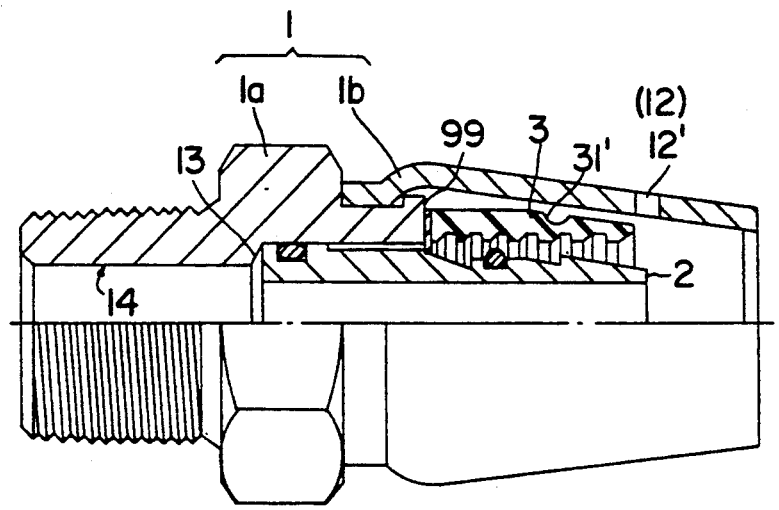
FIGS. 8 and 9 are sectional views of pipe joints of other embodiments of the present invention.
Figure 9:
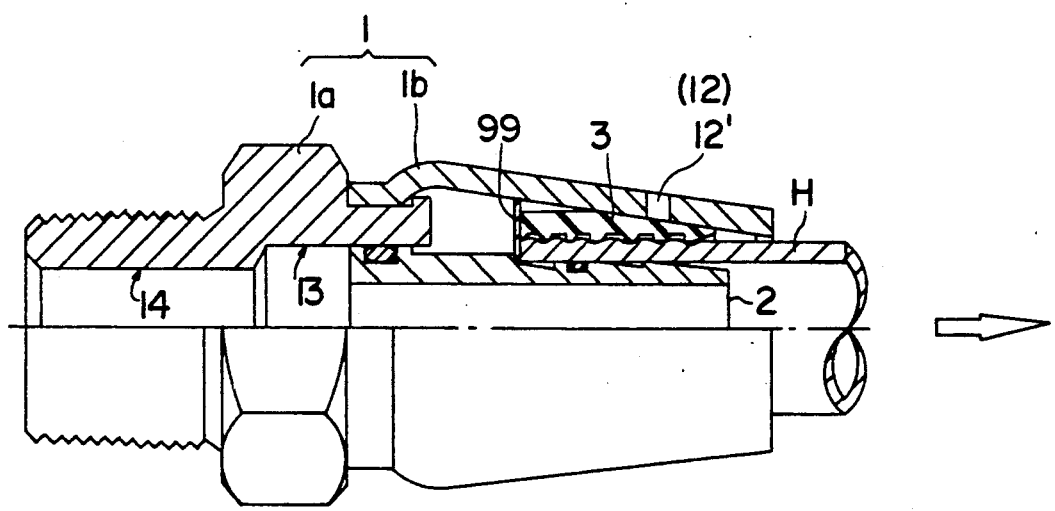

In the foregoing embodiment, the invention is applied to the pipe joint in which the space between the slidable cylinder 2 and the holding cylinder 3 is slightly smaller than the wall thickness of the pipe H, but moreover, as shown in FIGS. 8 and FIG. 9, the invention may be also applied to a pipe joint in which the outside diameter of the slidable cylinder 2 is larger than the inside diameter of the pipe to be inserted therein, and a stopping member 99 is disposed so as to press the holding cylinder 3 in the same direction along with the movement of the slidable cylinder 2 toward the pipe insertion port 10

Another embodiment of the invention is described by reference to FIG. 5.

The joint of this embodiment has a casing 4 disposed on the outer circumference of the socket 1b, and a stick A loaded with a spring thrusted outward in the radial direction is installed in this casing 4, and one end of the stick A is projecting through the upper wall of the casing 4 and the other end is inserted into a through hole 12' of the socket 1b.

Figure 5:
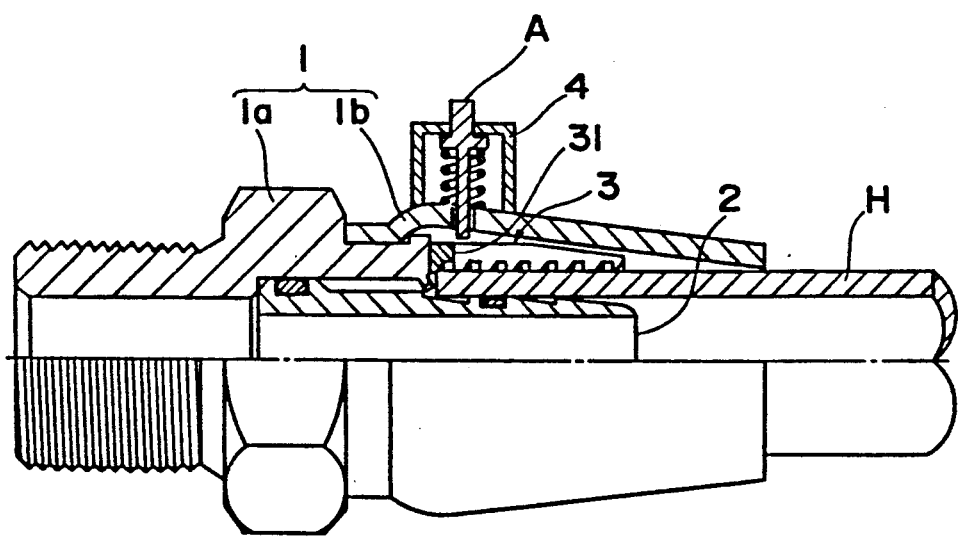
FIG. 5 is a semisectional view of another embodiment of the present invention.

The stick A, in a state of no pressing on its projecting end from the casing 4 as shown in FIG. 5, is positioned so that the other inner end confronts the outside of the holding cylinder 3, and in another state of pressing the stick A in with resisting the spring thrusting force, the other inner end is inserted into the end portion of the slit 30 of the holding cylinder 3.

Figure 6:
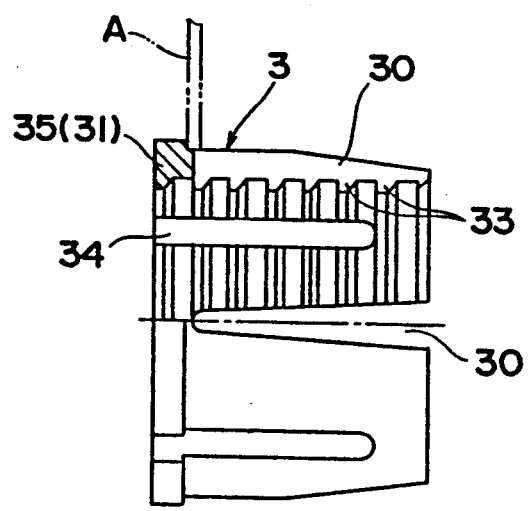
FIG. 6 is a semisectional view of a holding cylinder in another embodiment of the invention.
Figure 7:
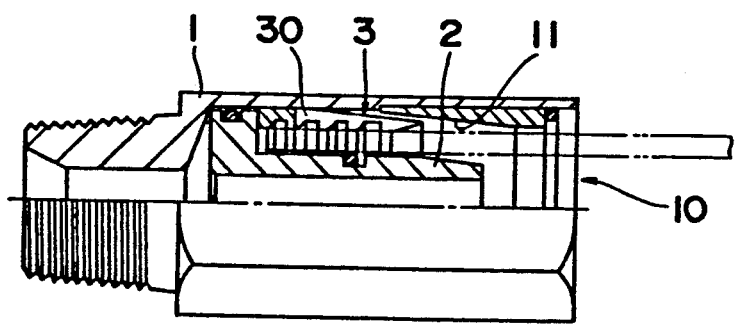
FIG. 7 is a semisectional view of a conventional pipe joint.

In this embodiment, the stopping part 31 formed in the holding cylinder 3 is the end part constituent wall of the slit 30, but it is not limited thereto. Aside from the slit 30, a through hole or a dent 31' as shown in FIG. 8 may be formed in the holding cylinder 3 as the stopping part 31, and the end edge of the holding cylinder 3 may also be used as the stopping part 31. Furthermore, as shown in FIG. 6, an outer projecting flange 35 may be disposed on the holding cylinder 3 as the stopping part 31. In this case, even if the holding cylinder 3 rotates relatively with and within the socket 1b, the outer projecting flange 35 securely functions as the stopping part 31.

Incidentally, in the pipe joints of the embodiments herein, thread structure is employed at the connecting section at the opposite end of the pipe insertion port, but it is not limited thereto, and other connecting structure may be employed as well.

What is claimed is:

1. A pipe joint which connects and disconnects a pipe easily comprising:
   a first cylindrical member with a small diameter through-hole and a large diameter through-hole, said small diameter through-hole being formed in an axial direction of said cylindrical member and open to one end of said cylindrical member, and said large diameter through-hole being formed so as to coaxially communicate with said small diameter through-hole and open to the other end of said cylindrical member;
   a second cylindrical member with a large diameter part and a small diameter part, said large part being axially slidable in said large diameter through-hole, and said small diameter part extending in an axial direction from said large diameter part;
   a tapered portion formed inside said large diameter through-hole and diminished in diameter in a direction toward said open end of said large diameter through-hole;
   a collet installed in said large diameter through-hole so as to be slidable in its axial direction, said collet, when moved toward said open end of said large diameter through-hole, engaging with said tapered portion and as a result reducing in diameter so as to securely hold a pipe between said collet and said small diameter part of said second cylindrical member; and
   a penetration opening formed in a circumferential wall defining said large diameter through-hole of said first cylindrical member;
   whereby when said pipe held and connected to said joint is moved towards said open end of said small diameter through-hole as a single unit with said collet and said second cylindrical member, a stick like member is pressed into said penetration opening and engaged with said collet, thus restraining movement of said collet toward said open end of said large diameter through-hole and the holding force between said collet and said small diameter part caused by the engagement of said collet with said tapered portion and by the radial contraction thereof being not applied on said connected pipe.

2. A pipe joint which connects and disconnects a pipe easily comprising:
   a first cylindrical member with a small diameter through-hole and a large diameter through-hole, said small through-hole being formed in an axial direction of said cylindrical member and open to one end of said cylindrical member, and said large diameter through-hole being formed so as to coaxially communicate with said small diameter through-hole and open to the other end of said cylindrical member;

a second cylindrical member with a large diameter part and a small diameter part, said large part being axially slidable in said large diameter through-hole, and said small diameter part extending in an axial direction from said large diameter part;

a tapered portion formed inside said large diameter through-hole and diminished in diameter in a direction toward said open end of said large diameter through-hole;

a collet installed in said large diameter through-hole so as to be slidable in its axial direction, said collet, when moved toward said open end of said large diameter through-hole, engaging with said tapered portion and as a result reducing in diameter so as to securely hold a pipe between said collet and said small diameter part of said second cylindrical member;

a penetration opening formed in a circumferential wall defining said large diameter through-hole of said first cylindrical member; and a stick like member biased by a compression spring and provided on said first cylindrical member with its inner end facing an outer surface of said collet so that said stick like member, when pressed against a biasing force of said spring, is inserted through said penetration opening to engage with said collet;

whereby when said pipe held and connected to said joint is moved towards said open end of said small diameter through-hole as a single unit with said collet and said second cylindrical member, said stick like member is pressed into said penetration opening and engaged with said collet, thus restraining movement of said collet towards said open end of said large diameter through-hole and the holding force between said collet and said small diameter part caused by the engagement of said collet with said tapered portion and by the radial contraction thereof being not applied on said connected pipe.

3. A pipe joint according to claim 1 or 2, wherein said large diameter through-hole comprises a plurality of through-hole sections with different diameters.

4. A pipe joint according to claim 1 or 2, wherein said tapered portion is formed into a single unit with said first cylindrical member.

5. A pipe joint according to claim 1 or 2, wherein said collet is provided with a hole in its circumferential wall through which said stick like member is inserted to engage with said collet.

6. A pipe joint according to claim 1 or 2, wherein said collet is provided with a dent on its circumferential wall into which said stick like member is inserted to engage with said collet.

7. A pipe joint according to claim 1 or 2, wherein a slit is provided in an circumferential wall into which said stick like member is inserted through an edge portion of said slit to engage with said collet.

8. A pipe joint according to claim 1 or 2, wherein said collet is provided with an outer projecting piece on its circumferential wall against which said stick like member abuts to engage with said collet.

9. A pipe joint according to claim 1 or 2, wherein the stick like member abuts against an end part of said collet to engage therewith.

10. A pipe joint according to claim 1 or 2, wherein an outer circumferential surface of said collet is tapered so as to correspond to said tapered portion.

11. A pipe joint according to claim 1 or 2, wherein said collet is made of elastic synthetic resin.

12. A pipe joint according to claim 1 or 2, wherein said penetration opening is a slit open to said open end of said large diameter through-hole.

13. A pipe joint according to claim 1 or 2, wherein said tapered portion is formed on inner surface of a sleeve which is attached to said first cylindrical member.

* * * * *